United States Patent [19]
Alan et al.

[11] Patent Number: 5,863,590
[45] Date of Patent: Jan. 26, 1999

[54] METHOD FOR PRODUCING AN ASEPTIC PACKAGED TOFU PRODUCT

[75] Inventors: Lu Jin Lun Alan; Lim Juay Ho; Tien Yeow Kong, all of Singapore, Singapore

[73] Assignee: Tetra Laval Holdings & Finance S.A., Pully, Switzerland

[21] Appl. No.: 669,921

[22] Filed: Jun. 25, 1996

[51] Int. Cl.[6] .................................. A23L 1/20; A23L 1/00
[52] U.S. Cl. .................... 426/634; 426/507; 426/656; 426/442; 426/399
[58] Field of Search .................................. 426/634, 507, 426/656, 442, 399

[56] References Cited

U.S. PATENT DOCUMENTS

| | | |
|---|---|---|
| 3,857,970 | 12/1974 | Tsumura et al. ............... 426/38 |
| 4,000,326 | 12/1976 | Okada et al. . |
| 4,140,811 | 2/1979 | Ogasa et al. . |
| 4,303,678 | 12/1981 | Ogasa et al. . |
| 4,514,433 | 4/1985 | Matsuura . |
| 4,564,530 | 1/1986 | Hugelshofer . |
| 4,636,398 | 1/1987 | Matsuura . |
| 4,673,583 | 6/1987 | Kuwata et al. . |
| 4,789,556 | 12/1988 | Okonogi et al. . |
| 4,791,001 | 12/1988 | Matsuura et al. . |
| 4,826,701 | 5/1989 | Joo et al. . |
| 4,828,869 | 5/1989 | Doi et al. . |
| 4,996,916 | 3/1991 | Miyawaki et al. . |
| 5,058,494 | 10/1991 | Hayashi et al. . |
| 5,124,165 | 6/1992 | Obata et al. . |
| 5,183,681 | 2/1993 | Okamoto et al. . |
| 5,190,787 | 3/1993 | Takeoka et al. . |
| 5,249,513 | 10/1993 | Ueda . |

*Primary Examiner*—Anthony J. Weier
*Attorney, Agent, or Firm*—Burns, Doane, Swecker & Mathis, L.L.P.

[57] ABSTRACT

A process for producing aseptically packaged tofu product which has an increased storage life and has an improved texture and taste. The process includes steps of extracting soy milk from soy bean, processing the soy milk at ultra-high temperature, and aseptically packaging the processed soy milk. In a preferred embodiment, the ultra-high temperature processing includes preheating the soy milk to a temperature of between 60° C. and 105° C., deaerating the soy milk, homogenizing the soy milk in a two stage homogenization process, sterilizing the soy milk by heating to between 129° C. and 145° C. for 2–30 seconds, cooling the sterilized soy milk first in a pre-cooler to a temperature of between 40° C. and 65° C., and then cooling the soy milk to a temperature of between 10° C. and 30° C. in a final cooler. The aseptic soy milk is then packaged by a process which includes adding a coagulant to the aseptic soy milk, aseptically packaging the soy milk, and incubating the packaged aseptic soy milk to form an aseptically packaged tofu product.

9 Claims, 3 Drawing Sheets

METHOD FOR PRODUCING AN ASEPTIC PACKAGED TOFU PRODUCT

BACKGROUND OF THE INVENTION

1. Field of the Invention

The present invention relates methods for producing a packaged tofu product, and more particularly to methods of producing and aseptically packaging tofu.

2. Description of the Related Art

Soy bean products, especially, a soy bean curd called tofu have recently become a popular high protein food for use in cooking. When tofu is used in cooking, it is desirable that the tofu have a firm texture so that the tofu does not lose its shape when it is cooked. In order to produce tofu having a firmer texture, a soy protein isolate is added to the soy bean protein. The addition of soy protein isolate increases firmness somewhat, however greater firmness often is desirable.

With the development of glucono-delta-lactone (GDL) as a food product additive, new methods for producing tofu using GDL as a coagulant have been developed. Tofu products including GDL are more easily produced in large quantities and have greater storage stability than tofu products produced by conventional processes. However, addition of too much of a coagulant, such as GDL, to increase the hardness of the tofu product, will adversely affect of the taste of the tofu product.

In order to increase the shelf life of the tofu product, packaged soy bean milk may be heat sterilized by a retort sterilization treatment. The tofu product produced by retort sterilization is called retort tofu or fresh tofu.

In order to further increase the shelf life of the tofu product, it is desirable that tofu products be aseptically packaged. Aseptic packaging of tofu increases the range of distribution which is available to the tofu producer. Processes for aseptic packaging of tofu include a step of Ultra High Temperature (UHT) treatment of the soy bean milk prior to packaging. However, such UHT treatment processes have a tendency to adversely affect the taste and/or texture of the final product when compared to non-aseptically packaged or fresh tofu.

SUMMARY OF THE INVENTION

The process according to the present invention produces an aseptically packaged tofu product which has an increased storage life and has an improved texture and taste over known aseptically packaged tofu products.

In a preferred embodiment, the process includes extracting soy milk from the soy beans; adding a soy protein isolate to the soy milk; homogenizing the soy milk and added soy protein isolate in a first two stage homogenization process; subjecting the soy milk with added soy protein isolate to an ultra-high temperature sterilization; mixing the aseptic soy milk with a coagulant in a aseptic mixing process to form a treated soy milk; aseptically packaging the treated soy milk; and incubating the aseptically packaged soy milk to form the aseptically packaged tofu product.

In another preferred embodiment, the process includes extracting soy milk from soy bean; preheating the soy milk to a preferred temperature of between 60° C. and 105° C.; deaerating the soy milk and homogenizing the soy milk; sterilizing the soy milk by heating to a preferred temperature between 125° C. and 145° C. for 2–65 seconds; cooling the sterilized soy milk first in a pre-cooler to a preferred temperature of between 40° C. and 65° C., and then cooling the soy milk to a preferred temperature of between 10° C. and 30° C. in a final cooler; and adding a coagulant to the aseptic soy milk, aseptically packaging, and incubating the packaged aseptic soy milk to form the aseptically packaged tofu product.

In another preferred embodiment, the process includes extracting soy milk from soy bean; sterilizing the soy milk by an ultra-high temperature treatment including steps of preheating, deaerating, heat treating and cooling; forming a coagulant solution by mixing $CaCl_2.2H_2O$ in water until completely dissolved, adding GDL to the $CaCl_2.2H_2O$ solution, and mixing until the mixture is clear; and adding the coagulant to the aseptic soy milk, aseptically packaging, and incubating the packaged aseptic soy milk to form the aseptically packaged tofu product.

BRIEF DESCRIPTION OF THE DRAWING FIGURES

The invention will be described in greater detail with reference to the accompanying drawings in which like elements bear like reference numerals, and wherein.

DETAILED DESCRIPTION OF THE PREFERRED EMBODIMENTS

The method according to the present invention for producing an aseptic packaged tofu product includes steps of extracting soy milk from soy bean, processing the soy milk at ultra-high temperature (UHT), and aseptically packaging the processed soy milk. In a preferred embodiment, the soy milk is extracted from the soy bean utilizing the process shown in FIG. 1.

Figure 1:
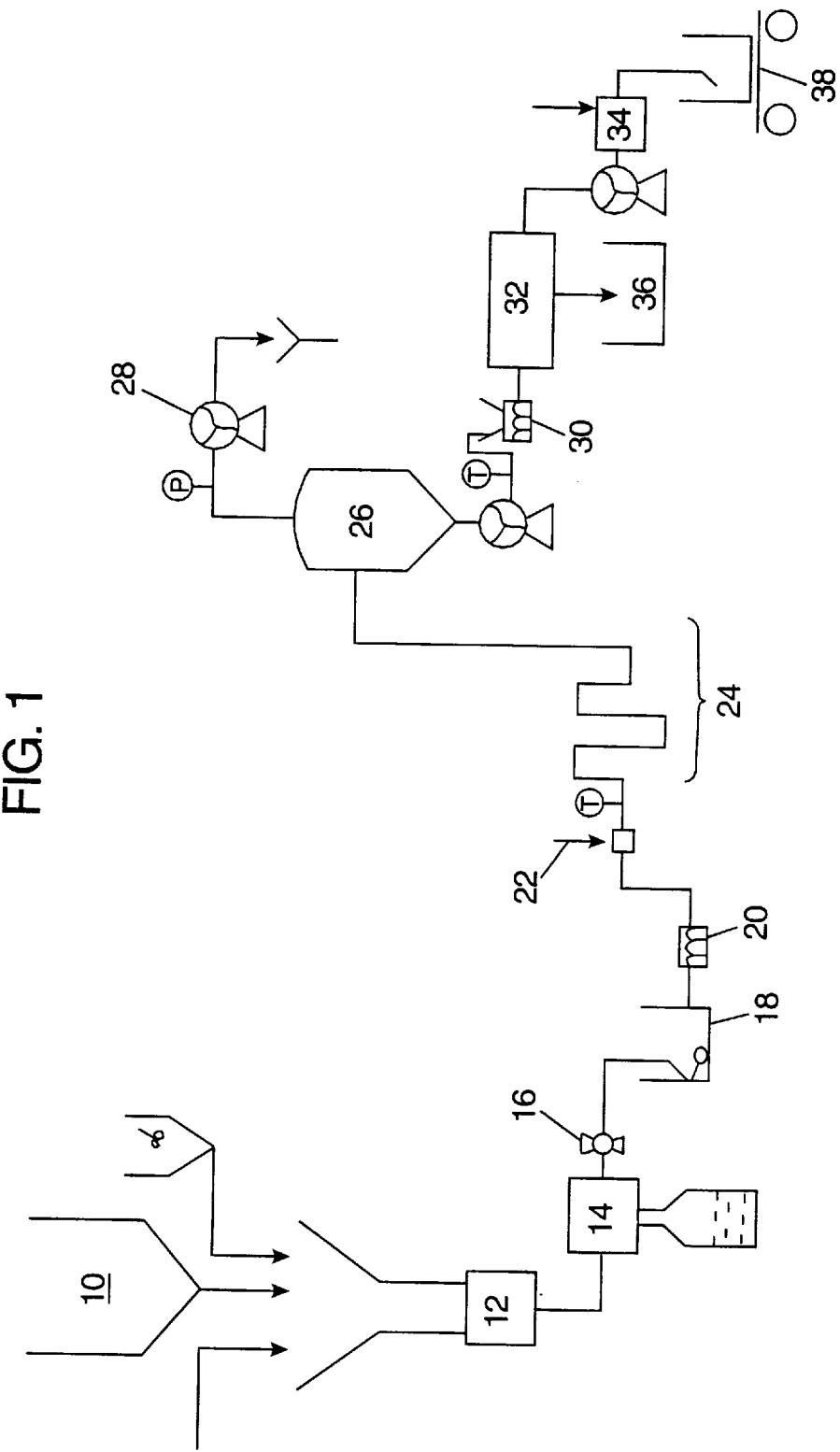
FIG. 1 is a schematic diagram of a process for preparation of a soy milk product according to the present invention.

In FIG. 1, the soy bean is prepared by soaking the soy bean in hypochloride, rinsing the soy bean with tap water, and then soaking the soy bean in tap water in the soaking hopper 10 for a period of between 3 and 15 hours, preferably between 5 and 12 hours, and even more preferably 5 to 6 hours at 25° C. Alternatively, the step of soaking in hypochloride may be omitted and the soy bean may prepared by a one step soaking process by soaking the soy bean in tap water for 5 hours at 25° C. However, when omitting the hypochloride soaking step, the bean must be as clean as Canadian bean Grade 1. After soaking, the water is drained from the soaked bean. The prepared soy bean is then combined with an anti-foaming suspension and water, and is fed into a first grinder 12 where the soy bean is ground. Suitable anti-foaming agents are commercially available in powdered form. Preferred anti-foaming agents include the anti-foaming agent powder which is available from Tosu Suppliers Trading Co. and includes 92.5% glycerine fatty acid ester, 4% soybean lecithin, 3% calcium carbonate, and 0.5% silicon resin. The powdered anti-foaming agent is added to the soy bean in a suspension which is preferably 0.5% to 1.5% anti-foaming agent, and more preferably 0.7% to 1.0% anti-foaming agent. Because the anti-foaming agent does not dissolve in water, the suspension must be subject to constant stirring.

From the first grinder 12, the soy bean is transported to a second grinder 14 where it is more finely ground to produce a soy bean slurry. The first grinder 12 is preferably a disc mill grinder, while the second grinder is preferably a colloid mill grinder. However, other types of grinders may also be used in place of the disc mill and colloid mill grinders.

The soy bean slurry is then pumped by the rotary pump 16 from the second grinder 14 into the holding hopper 18 where it is agitated to prevent separation. The soy bean slurry is then transported out of the holding hopper 18 by the positive displacement pump 20 and cooked by the injection of culinary steam. The culinary steam is injected at a steam injection port 22 directly into the soy bean slurry which is being transported through a tube. The slurry is heated to between 90° C. and 110° C., preferably between 95° C. and 105° C., and more preferably approximately 100° C. by the steam injection. The slurry is then held for a period of time by means of the holding tube 24. The holding time in the holding tube 24 is between 1 and 10 minutes, preferably between 2 and 6 minutes, and more preferably approximately 4 minutes. The thermally treated or cooked slurry is then deaerated in a vacuum vessel 26 having a vacuum pump 28.

The deaerated slurry is pumped by a second positive displacement pump 30 into a decanter 32 where the soy milk is extracted from the soy bean slurry by removing the fibrous material and curd residue called okara. The okara is collected in the hopper 36. The extracted soy milk, which has a soluble solid content between 11° brix and 15° brix, and preferably 13° brix to 14° brix, is cooled to a temperature of 3° C. to 20° C., preferably 5° C. to 10° C., by cold water flowing through a heat exchanger 34.

The soy milk which has been extracted by the process of FIG. 1 is received in a hopper 38 in which the soy milk may be stored for a period of time before further processing. Alternatively, the soy milk is transported directly to the UHT treatment process, shown in FIG. 2, for use immediately in the production of aseptic tofu. When the soy milk passes immediately to the UHT treatment process, the cooling by the heat exchanger 34 may not be necessary. The temperature and pressure are preferably monitored during the process by the temperature and pressure sensors T, P. The system of FIG. 1 for the extraction of soy milk from soy bean is the system known as the Tetra Alwin soy plant.

The soy milk which has been extracted, for example, in the extraction process illustrated in FIG. 1, is then processed by an UHT treatment process. However, prior to UHT treatment, the soy milk may be prepared by the addition of additives in an amount depending on the firmness of the tofu product which is desired. The soy milk preparation for a firm tofu product includes mixing a soy protein isolate, such as SAMPROSOY 90 MP, with the soy milk, then hydrating the mixture, and homogenizing the mixture prior to UHT treatment. The hydration of the mixture is performed to make sure the dried soy protein isolate is completely dissolved. The soy protein isolate which is added to the soy milk is preferably in a solution which includes 0.5% to 3.0%, preferably 1.5% to 2.0% soy protein isolate. The homogenization of the soy milk with added soy protein isolate is preferably a two stage homogenization which is carried out at pressures of 100 to 140 bar, preferably 110 to 130 for the first stage, and 10 to 50 bar, preferably 20 to 40 bar for the second stage. This two stage homogenization process is the first of two such two stage homogenization processes. The soy milk is subjected to the second two stage homogenization process during UHT treatment. The prepared soy milk product with added soy protein isolate may be cooled for storage to a temperature of 0° C. to 20° C., preferably 5° C. to 10° C., by cold water flowing through a heat exchanger. Alternatively, the prepared soy milk may be passed directly to a buffer tank 40 of the UHT process, in which case, cooling may not be required.

Figure 2:
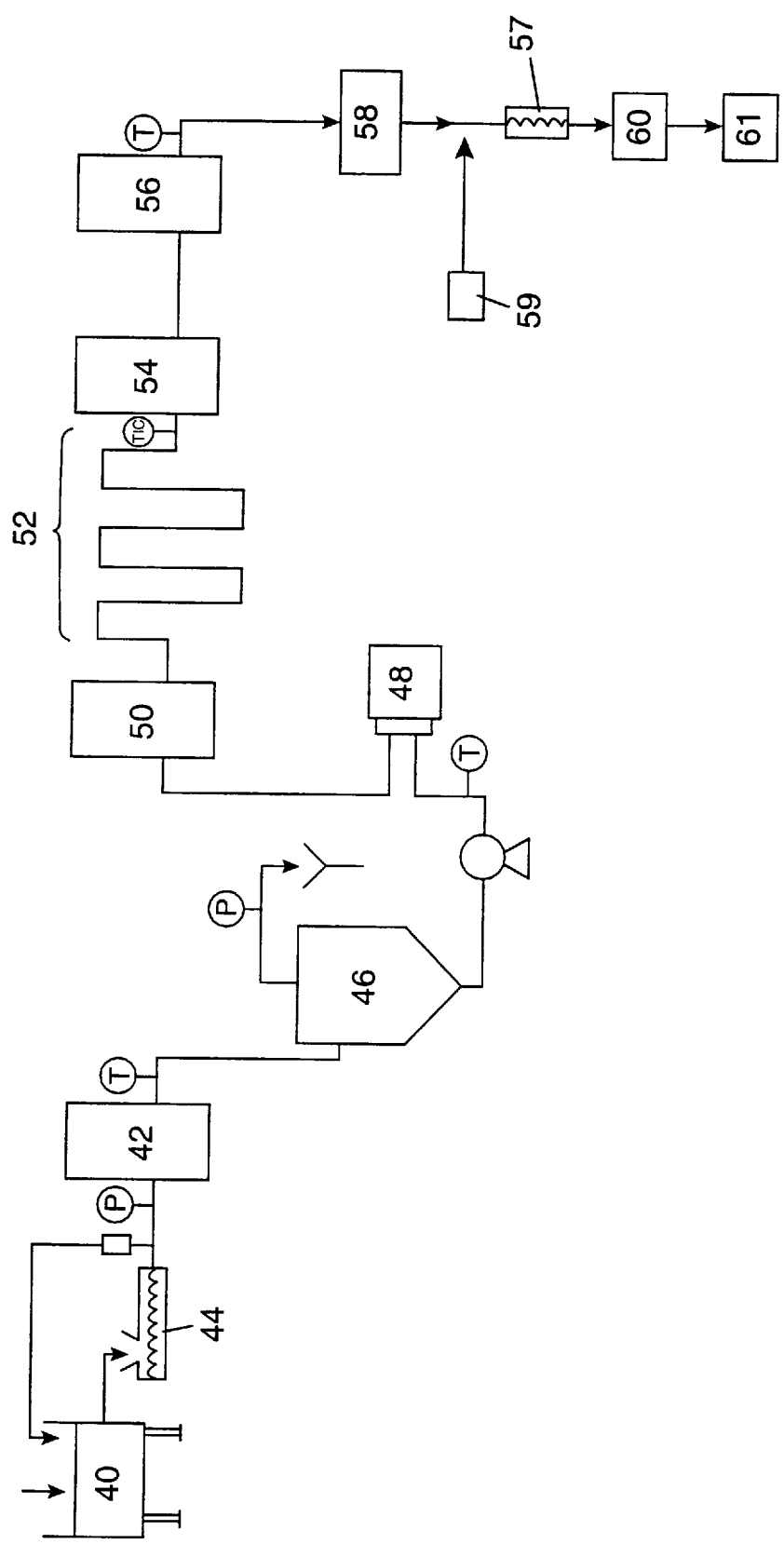
FIG. 2 is a schematic diagram of a process for ultra-high temperature treatment of soy milk according to the present invention.

An UHT process in accordance with the present invention is illustrated in FIG. 2. The prepared soy milk product with added soy protein isolate is pumped from a buffer tank 40 into a preheater 42 by a positive displacement pump 44. The soy milk is preheated to a temperature of 65° C. to 100° C., preferably, 75° C. to 90° C. in the preheater 42, and then deaerated at 57° C. to 85° C., preferably 67° C. to 82° C. in a deaerator vessel 46. The preheater may be any known type of heater such as a plate-type indirect heater or a tubular indirect heater. The soy milk which has been deaerated is then pumped into a homogenizer 48. The homogenizer 48 is preferably a two stage homogenizer which homogenizes at 100 to 170 bar, preferably 140 to 160 bar, for the first stage, and 10 to 100 bar, preferably 20 to 40 bar for the second stage.

After homogenization, the soy milk is heat treated to sterilize the soy milk by a heating assembly including a main heater 50 and a holding tube 52. The main heater 50 is an indirect heat exchanger, such as a plate type heat exchanger. An acceptable indirect heat treatment for sterilization includes heating to 130° C. to 145° C., for 1 to 20 seconds, preferably 134° C. to 140° C., for 2 to 8 seconds. Alternatively, lower temperature, longer time heat treatment may be used. Lower temperature, longer time heat treatment helps to reduce the fouling of the sterilization apparatus when processing protein enriched soy milk. Lower temperature, longer time heat treatment would include treatment at 125° C. to 140° C., for 2 to 65 seconds, preferably 130° C. to 135° C., for 8 to 24 seconds. A suitable system for the aseptic processing of the soy milk is the Tetra Therm Aseptic plant. Examples of combinations of temperatures and holding times which have been found to achieve acceptable UHT treatment are as follows:

| Temperature (°C.) | Holding Time (Seconds) |
| --- | --- |
| 125 | 66 |
| 130 | 20 |
| 135 | 7 |
| 140 | 2 |
| 145 | 1 |

Following the heat treatment, the soy milk is preferably cooled by a two stage cooling process. A pre-cooling heat exchanger 54 cools the aseptic soy milk to 40° C. to 65° C., preferably 50° C. to 55° C., and then a final cooling heat exchanger 56 cools the soy milk to between 10° C. and 30° C., preferably between 5° C. and 20° C. The pre-cooling heat exchanger 54 may use the raw or unsterilized soy milk product as a cooling medium to pre-cool the sterilized soy milk and at the same time heat exchanger 54 improves the efficiency of the overall process pre-heating the raw soy milk. The final cooling heat exchanger 56 may be a commercial refrigeration unit.

The cooled aseptic soy milk may be transferred to an aseptic buffer tank 58 such as Tetra Alsafe where the soy milk is stored temporarily. The cooled aseptic soy milk is then transferred to an aseptic filler 60 by means of air pressure in the aseptic tank 58. The dosing of coagulant is done by injecting the sterilized coagulant into the soy milk and may be performed by any suitable aseptic dosing apparatus 59, such as the Tetra Aldose unit. Preferably the dosing apparatus 59 includes a filter by which the microbes in the coagulant solution may be filtered off. The preferred coagulant solution for use in the process according to the present invention includes water, GDL, and $CaCl_2.2H_2O$.

The preferred coagulant for use in the process of the present invention is prepared by mixing $CaCl_2.2H_2O$ with cold tap water at 0° C. to 20° C., preferably 0° C. to 10° C., and most preferably 4° C. The $CaCl_2.2H_2O$ is mixed with the water until it is completely dissolved. The coagulant GDL is then added to the $CaCl_2.2H_2O$ solution and mixed until it is completely dissolved and the solution is clear. The coagulant formed by this process includes 20% to 30%, preferably 25% to 35% w/v GDL, 1% to 6%, preferably about 3% w/v $CaCl_2.2H_2O$, and the remainder water. For best results, the coagulant solution should be used within 2 hours, and preferably within 1 hour.

The resulting aseptic soy milk with the coagulant solution is further mixed well by means of a static in-line mixer 57 in order to homogenize the soy milk and coagulant. The mixed soy milk and coagulant is then packaged by a known aseptic packaging machine 60, such as a Tetra Brik Aseptic/3 (TBA/3) machine. This process is continuous and involves forming packages 61 from a single sheet of pre-sterilized material, filling the packages 61 with aseptic soy milk and coagulant solution, and sealing the packages 61 under aseptic conditions.

Figure 3:
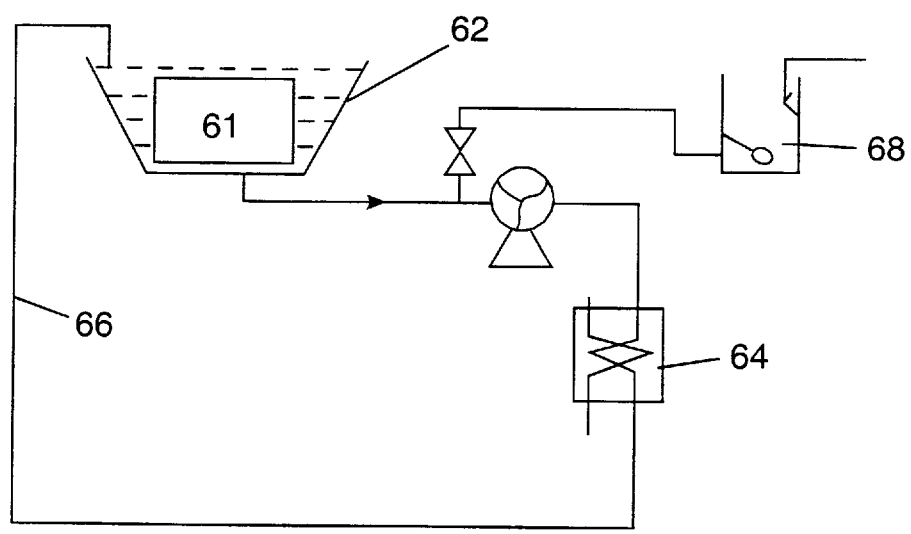
FIG. 3 is a schematic diagram of the incubation processing of the packaged tofu.

After aseptic packaging, the tofu is coagulated within the packages 61 by an incubation process described below. A water bath 62 for carrying out the incubation process is illustrated in FIG. 3. The aseptic packages of tofu 61 are submerged in the water bath 62. Hot water which has been heated by a heater 64 to a temperature of 70° C. to 95° C., preferably 80° to 95° C., is circulated through the water bath by a circulation system 66 for 30 to 60 minutes, preferably 40 to 50 minutes, during which time the tofu within the packages 61 coagulates. The packages 61 are then cooled by circulating cool water from a cool water supply 68 through the circulating system 66 at a temperature of 15° C. to 45° C., preferably 25° C. to 35° C., through the water bath for 10 to 30 minutes, preferably 15 to 25 minutes. Cooling of the packages 61 immediately after incubation is needed to avoid spoilage. The tofu packages 61 which have coagulated and cooled are removed from the water bath and may be further cooled naturally to ambient temperature.

The aseptically packaged tofu which has been prepared according to the present invention may be stored at ambient temperature for extended periods of time. The shelf life of tofu packaged according to the process of the present invention is 6 to 12 months, preferably 8 to 10 months.

The specific apparatus shown in FIGS. 1–3 are shown by way of example, however, each these apparatus may be modified or replaced by other known apparatus which perform similar functions.

The following examples of processes for producing aseptically packaged tofu are provided herein for purposes of illustration only and are not intended as limitations on the scope of the invention.

EXAMPLE 1

Canadian soy bean in an amount of 250 kg was prepared by soaking in 100 ppm hypochloride for 30 mins, rinsing with tap water, and soaking in tap water 12 hrs. The water was drained out after 12 hrs. and the prepared bean was supplied at 160 kg/hr to a grinding disc mill along with a 1% solution of an anti-foaming agent supplied at 70 kg/hr and water supplied at 240 kg/hr. The anti-foaming agent used was a powder including 92% glycerine fatty acid ester, 4.0% soybean lecithin, 3.0% calcium carbonate, and 0.5% silicone resin. The soy beans were ground a second time in a colloid mill to form a slurry. The slurry was cooked at 100° C. for 4 mins. by steam injection. The slurry was deaerated with zero vacuum, and then the Okara was separated by decanting. The resulting soy milk having a soluble solid content of 13° brix was cooled to 8° C. for storage and then subjected to the UHT process described below.

989 kg of soy milk at 55° C. was combined with 22 kg of 1.8% soy protein isolate (SAMPROSOY 90 MP) and mixed well. The mixture was hydrated for 30 mins. and then homogenized according to a two stage homogenization process at 120 bar for the first stage and then at 30 bar for the second stage. The soy milk was then cooled to 8° C. for storage prior to processing in the UHT treatment process.

The soy milk UHT treatment process included preheating to 85° C., deaerating at 75° C., first homogenization at 150 bar, second homogenization at 30 bar, sterilization at 137° C. for 4 sec, pre-cooling to 55° C., and final cooling to 10° C. The aseptic soy milk was then dosed with coagulant including 28% GDL, 3% $CaCl_2.2H_2O$, and 69% water, aseptically packaged, and the packages were incubated according to the same steps as in Example 1.

The resulting aseptic packaged tofu had a white color, a very firm texture, and a good but very slightly powdery taste. The aseptic tofu included 7.9% protein, 2.8% fat, a pH of 5.82, and a sugar content of 0.2° brix in 10% w/w distilled water. The shelf life of this aseptic packaged tofu product was 9 months.

The firmness of a 4×4×3.5 cm sample of the aseptic tofu product was tested by the Fudoh Rheometer NRM-2002J. The gel breaking point, which is the force divided by the area of the plunger, was found to be 163.7 $g/cm^2$ and 169.4 $g/cm^2$ for two samples. A gel strength, which is the force applied times the distance the plunger traveled, was found to be 109.2 gcm and 133.0 gcm for the two samples.

EXAMPLE 2

Canadian soy bean in an amount of 180 kg was prepared by soaking in tap water at 25°–30° C. for 5 hrs. The water was drained out and the prepared bean was supplied at 160 kg/hr to a grinding disc mill along with a 0.78% solution of an anti-foaming agent supplied at 90 kg/hr and water supplied at 150 kg/hr. The anti-foaming agent used was a powder including 92% glycerine fatty acid ester, 4.0% soybean lecithin, 3.0% calcium carbonate, and 0.5% silicone resin. The soy beans were ground a first time in a disc mill and a second time in a colloid mill to form a slurry. The slurry was cooked at 100° C. for 4 mins. by steam injection. The slurry was deaerated with zero vacuum and then the Okara was separated by decanter. The resulting soy milk having a sugar content of 14° brix was cooled to 60° C. before subjecting the soy milk to an UHT process.

The soy milk was prepared for the UHT process by adding 6.66 kg of soy protein isolate (SAMPROSOY 90 MP) to 200 kg of the soy milk and mixing for 3 mins. The soy milk was hydrated for 30 mins. with very slow agitation and then homogenized in two stages at 120 bar in the first stage and then 30 bar in the second stage. The prepared soy milk was then stored in a buffer tank prior to UHT processing.

The UHT processing included preheating to 80° C. in a plate heat exchanger, deaerating at 72° C., first homogenization at 150 bar , second homogenization at 30 bar, sterilization at 132° C. for 15 sec in a plate heat exchanger, pre-cooling to 50° C., and final cooling to 10° C. The aseptic soy milk at a flow rate of 881 L/h was dosed with a coagulant including 28% GDL, 3% $CaCl_2.2H_2O$, and 69% water at a flow rate of 19 L/h and mixed well with a static in-line mixer. The aseptic soy milk dosed with the coagulant was then aseptically packaged in presterilized 250 mL Tetra Brik containers by a TBA-3 aseptic filling machine. The packaged soy milk was incubated by immersing the packages in a hot water bath at 90° C. for 45 minutes followed immediately by cooling with 30° C. running water for 20 mins.

The resulting aseptic tofu product was found to have a very firm texture, a very good taste, and a creamy white color. The resulting aseptic tofu was found to have 8.4% protein, 2.9% fat, a pH of 5.33, and a soluble solid content of 0.0° brix in 10% w/w distilled water. The shelf life of the aseptic tofu product was found to be 9 months.

The firmness of a 4×4×3.5 cm sample of the aseptic tofu product was tested by the Fudoh Rheometer NRM-2002 J. The gel breaking point, which is the force divided by the area of the plunger, was found to be 253.5 g/cm$^2$ and 242.0 g/cm$^2$ for two samples. A gel strength, which is the force applied times the distance the plunger traveled, was found to be 139.3 gcm and 123.5 gcm for the two samples.

While the invention has been described in detail with reference to preferred embodiments and specific examples thereof, it will be apparent to one skilled in the art that various changes can be made, and equivalents employed without departing from the spirit and scope of the invention.

What is claimed is:

1. A method of producing an aseptically packaged tofu product from soy beans comprising:

extracting soy milk from the soy beans;

adding a soy protein isolate to the soy milk;

homogenizing the soy milk and added soy protein isolate in a first two stage homogenization process;

subjecting the soy milk with added soy protein isolate to an ultra-high temperature sterilization;

mixing the aseptic soy milk with a coagulant in an aseptic mixing process to form a treated soy milk;

aseptically packaging the treated soy milk; and incubating the aseptically packaged soy milk to form the aseptically packaged tofu product;

wherein the homogenized soy milk with added soy protein isolate is cooled for storage, preheated, and homogenized by a second two stage homogenization process prior to subjecting the soy milk with added soy protein isolate to ultra-high temperature sterilization.

2. The method of claim 1, wherein the first and second two stage homogenization processes include homogenizing at a first pressure in a first stage and homogenizing at a second pressure which is lower than the first pressure in a second stage.

3. The method of claim 2, wherein the first stage homogenization is carried out at 100 to 170 bar and the second stage homogenization is carried out at under 70 bar.

4. The method of claim 1, wherein the soy milk is sterilized by heating to 125° C. to 140° C. for 2 to 65 seconds.

5. The method of claim 1, wherein the soy milk is sterilized by heating to 130° C. to 145° C. for 1 to 20 seconds.

6. The method of claim 1, wherein the soy milk is sterilized by heating in a plate heat exchanger.

7. The method of claim 1, wherein the ultra-high temperature sterilization process includes cooling the sterilized soy milk by a two stage cooling process which includes cooling in a pre-cooler to between 40° C. and 65° C. and cooling in a final cooler between 10° C. and 30° C.

8. A method of producing an aseptically packaged tofu product comprising:

extracting soy milk from soy beans;

adding a soy protein isolate to the soy milk;

homogenizing the soy milk and added soy protein isolate in a two-stage homogenization process;

subjecting the soy milk with added soy protein isolate to an ultra-high temperature sterilization including the steps of:

preheating the soy milk to a temperature of between 60° C. and 105° C.;

dearating the soy milk and homogenizing the soy milk;

sterilizing the soy milk by heating to between 129°C. and 145° C. for 2–30 seconds; and cooling the sterilized soy milk first in a precooler to a temperature of between 40° C. and 65° C., and then cooling the soy milk to a temperature of between 10° C. and 30° C. in a final cooler;

mixing the sterilized soy milk with a coagulant in an aseptic mixing process to form a treated soy milk;

aseptically packaging the heated soy milk; and incubating the aseptically packaged soy milk to form the aseptically packaged tofu product;

wherein the homogenized soy milk with added soy protein isolate is cooled for storage, preheated, and homogenized by a second two stage homogenization process prior to subjecting the soy milk with added soy protein isolate to ultra-high temperature sterilization.

9. The method of claim 1, wherein the soy milk with added soy protein isolate is deaerated between the first and second two stage homogenization processes.

* * * * *